US010268570B2

(12) United States Patent
Morris (10) Patent No.: US 10,268,570 B2
(45) Date of Patent: Apr. 23, 2019

(54) METHODS, SYSTEMS, AND COMPUTER READABLE MEDIA FOR AUTOMATED GENERATION OF TEST FILES AND TESTING NETWORK EQUIPMENT USING SAME (71) Applicant: Oracle International Corporation, Redwood Shores, CA (US)

(72) Inventor: Robert Michael Morris, Raleigh, NC (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/147,887

(22) Filed: May 5, 2016

(65) Prior Publication Data

US 2017/0322873 A1 Nov. 9, 2017

(51) Int. Cl.
*G06F 11/22* (2006.01)
*G06F 11/36* (2006.01)
*H04L 12/24* (2006.01)

(52) U.S. Cl.
CPC .......... *G06F 11/3684* (2013.01); *G06F 11/22* (2013.01); *G06F 11/3668* (2013.01); *H04L 41/00* (2013.01)

(58) Field of Classification Search
CPC ................................................ G06F 11/3668
(Continued)

(56) References Cited

U.S. PATENT DOCUMENTS 5,577,198 A 11/1996 Willrett et al.
5,669,000 A 9/1997 Jessen et al.
(Continued)

FOREIGN PATENT DOCUMENTS

EP 0 347 360 A2 5/1989
EP 0 973 296 A2 1/2000
(Continued)

OTHER PUBLICATIONS

"Configure Unit Tests by Using a .runsettings File"; Microsoft Developer Network website (msdn.microsoft.com); Apr. 11, 2016.*
(Continued)

*Primary Examiner* — Qing Chen
*Assistant Examiner* — Clint Thatcher
(74) *Attorney, Agent, or Firm* — Jenkins, Wilson, Taylor & Hunt, P.A.

(57) ABSTRACT

The subject matter described herein includes methods, systems, and computer readable media for automated generation of test files and for related testing. According to one method, the method includes receiving a configuration file, where the configuration file indicates a test case or a test plan to be generated, wherein the configuration file includes a feature identifier or a bug identifier and information about a system under test (SUT). The method also includes generating at least one test file based on the configuration file, wherein the at least one test file is for testing a feature or a bug in the SUT associated with the feature identifier or the bug identifier in the configuration file. The method further includes generating at least one directory based on the configuration file and storing the at least one test file in the at least one directory. The method also includes testing the feature or bug in the SUT using the at least one test file.

16 Claims, 10 Drawing Sheets

(58) Field of Classification Search
USPC .......................................................... 717/124
See application file for complete search history.

(56) References Cited

U.S. PATENT DOCUMENTS

| | | | |
|---|---|---|---|
| 5,680,437 A | 10/1997 | Segal | |
| 5,732,213 A | 3/1998 | Gessel et al. | |
| 5,754,755 A * | 5/1998 | Smith, Jr. ........... | G06F 11/3684 714/38.1 |
| 5,987,633 A | 11/1999 | Newman et al. | |
| 6,148,277 A | 11/2000 | Asava et al. | |
| 6,158,031 A | 12/2000 | Mack et al. | |
| 6,178,181 B1 | 1/2001 | Glitho | |
| 6,243,835 B1 * | 6/2001 | Enokido ................ | G06F 11/28 714/33 |
| 6,327,267 B1 | 12/2001 | Valentine et al. | |
| 6,330,614 B1 | 12/2001 | Aggarwal et al. | |
| 6,487,286 B1 | 11/2002 | Reaves et al. | |
| 6,493,425 B1 | 12/2002 | Abe | |
| 6,515,985 B2 | 2/2003 | Shmulevich et al. | |
| 6,611,532 B1 | 8/2003 | Madour et al. | |
| 7,117,411 B2 | 10/2006 | McNeely et al. | |
| 7,299,382 B2 * | 11/2007 | Jorapur ............... | G06F 11/3684 703/22 |
| 8,028,276 B1 * | 9/2011 | Bessonov ........... | G06F 11/3684 717/124 |
| 8,561,036 B1 * | 10/2013 | Beans .................. | G06F 11/368 717/124 |
| 2002/0105969 A1 | 8/2002 | Benedyk et al. | |
| 2002/0162059 A1 | 10/2002 | McNeely et al. | |
| 2007/0162894 A1 * | 7/2007 | Noller ................ | G06F 11/3684 717/124 |
| 2010/0218168 A1 * | 8/2010 | Gonzales, II ....... | G06F 11/3664 717/124 |
| 2011/0083122 A1 * | 4/2011 | Chen .................. | G06F 11/3664 717/124 |
| 2013/0152047 A1 * | 6/2013 | Moorthi .............. | G06F 11/368 717/124 |
| 2014/0075415 A1 * | 3/2014 | Goldish .............. | G06F 11/3684 717/124 |

FOREIGN PATENT DOCUMENTS

| | | |
|---|---|---|
| EP | 1 026 861 A2 | 8/2000 |
| EP | 1 054 568 A2 | 11/2000 |
| EP | 1 356 686 B1 | 7/2010 |
| WO | WO 02/056541 A2 | 7/2002 |
| WO | WO 02/060192 A2 | 8/2002 |

OTHER PUBLICATIONS

"INI File"; Wikipedia.org website; Mar. 8, 2016.*
"Black Box"; Wikipedia.org website; Apr. 27, 2016.*
Lars Vogel; "Unit Testing with Junit—Tutorial"; Vogella.com website; Sep. 21, 2015.*
Decision to Grant a European Patent pursuant to Article 97(1) EPC for European Patent Application No. 02705919.5 (dated Jun. 24, 2010).
Communication under Rule 71(3) EPC for European Patent Application No. 02 705 919.5 (dated Jan. 14, 2010).
Communication pursuant to Article 94(3) EPC for European Patent Application No. 02 705 919.5 (dated May 27, 2008).
Office Action for U.S. Appl. No. 09/768,881 (dated Dec. 14, 2004).
Office Action for U.S. Appl. No. 09/768,881 (dated Jan. 9, 2004).
International Preliminary Examination Report for International Application No. PCT/US02/01977 (dated Nov. 12, 2003).
Office Action for U.S. Appl. No. 09/768,881 (dated May 9, 2003).
International Search Report for International Application No. PCT/US 02/01977 (dated Jul. 10, 2002).
Notice of Allowance and Fee(s) Due for U.S. Appl. No. 10/011,673 (dated Feb. 14, 2006).
Response to Rule 312 Communication for U.S. Appl. No. 10/011,673 (dated Dec. 27, 2005).
Notice of Allowance and Fee(s) Due and Interview Summary for U.S. Appl. No. 10/011,673 (dated Jul. 14, 2005).
Non-Final Office Action for U.S. Appl. No. 10/011,673 (dated Sep. 14, 2004).
International Search Report for International Application No. PCT/US 01/48677 (dated Oct. 14, 2002).
"Expect," NIST, https://www.nist.gov/services-resources/software/expect, pp. 1-4, (Aug. 31, 2016).

* cited by examiner

```
# Do not use any extra whitespaces
# this file has prefilled values to show you how to use the file.
# Deviation from this format will cause errors.

# This is the example config file for a feature testplan
# All of these values are required for the generator to work
If they are not provided, there will be errors for multiple values, use a comma separated list like the example below
type=option1, option2, option3 this only allows for 1 type
[TYPE]
type=testplan this only allows for 1 type
no spaces, use underscores
[FEATURE]
name=Trial allows for multiple options
[BUG]
id=123456789,987654321
id=123456789 this only allows for 1 type
[FD_INFO]
id=FD006789
url=cgbu.doccenter.com this only allows for 1 type
[REDMINE]
id=1234

# This is the base directory to put the generated files
# if you want to put them in the current dir, use .
# Only 1 path can be specified
# windows directories require an extra backslash as seen in the example
# linux does not require this
[DIRECTORY]
path=.
# windows example
path=C:\\Users\\RepoFolder linux example
path=/path/to/repo
```

```
# Do not use any extra whitespaces
# this file has prefilled values to show you how to use the file.
# Deviation from this format will cause errors.

# This is the example config file for a feature testplan
# All of these values are required for the generator to work
If they are not provided, there will be errors for multiple values, use a comma separated list like the example below
type=option1, option2, option3 this only allows for 1 type
[TYPE]
type=bug this only allows for 1 type
no spaces, use underscores
[BUG]
id=123456789
subject=BUG1
description=<<EOT
yo yo yo
again yo
EOT

[BUG1]
id=587894321
subject=BUG2
description=<<EOT
"This is a bug description."
EOT this only allows for 1 type
[BCR]
id=1234 this only allows for 1 type
[REDMINE]
id=5678

# This is the base directory to put the generated files
# if you want to put them in the current dir, use .
# Only 1 path can be specified
# windows directories require an extra backslash as seen in the example
# linux does not require this
[DIRECTORY]
path=.
# windows example
# path=C\:\\Users\\RepoFolder
# linux example
path=/path/to/repo
```

```
<case xmlns="http://www.company.com/ttsl">
    <meta name="title">Bug Test: Bug 123456789 : BUGGY testcase</meta>
    <meta name="description">

<!-- start PROBLEM DESCRIPTION section -->
    <h4>PROBLEM DESCRIPTION:</h4>
    <p>This is a bug description.</p>

<!-- start PROCESS DESCRIPTION section -->
    <h4>PROCESS:</h4>
    <ol>

<li>
        <ul style="margin-top:.5em">
          <strong>Setup:</strong>
          <li>Step 1</li>
          <li>Step 2</li>
          <li>Step 3
            <sup>1</sup>
          </li>
        </ul>
        <ul style="margin-top:.5em">
          <strong>Actions:</strong>
          <li>Step 1</li>
          <li>Step 2</li>
          <li>Step 3
            <sup>1</sup>
          </li>
        </ul>
        <ul style="margin-top:.5em">
          <strong>Verifications:</strong>
          <li>Step 1</li>
          <li>Step 2</li>
          <li>Step 3
            <sup>1</sup>
          </li>
        </ul>
        <ul style="margin-top:.5em">
          <strong>Cleanup:</strong>
          <li>Step 1</li>
          <li>Step 2</li>
          <li>Step 3
            <sup>1</sup>
          </li>
        </ul>
      </li>

</ol>

<h4>RESOURCES:</h4>
    <table class="table table-striped table-bordered" style="max-width: 30em">
      <tr>
```

METHODS, SYSTEMS, AND COMPUTER READABLE MEDIA FOR AUTOMATED GENERATION OF TEST FILES AND TESTING NETWORK EQUIPMENT USING SAME

TECHNICAL FIELD

The subject matter described herein relates to testing computer networking equipment. More specifically, the subject matter relates to methods, systems, and computer readable media for automated generation of test files and for testing networking equipment using same.

BACKGROUND

Network equipment manufacturers typically perform tests for design verification, quality assurance and/or other purposes. These manufacturers may use testing software and/or related tools that need to be customized for a given bug (e.g., issue) or feature. For example, as an operating system or other software for a given product is developed, one or more testers may develop test cases or test plans for testing each feature (e.g., functionality or a related portion of software) in the operating system. Moreover, in this example, if bugs are identified during testing, additional test cases may be developed to identify when and/or whether the bugs are resolved.

Sometimes generating test files, such as test plans or test cases, for testing various features and/or bugs can be tedious and error-prone. For example, manual generation of test files can result in improper or invalid test files, such as test files with improper formatting or invalid syntax. When improper or invalid test files are generated, the code review process is lengthened, which can lengthen the test authorship and approval process, which can also lengthen the overall testing process.

SUMMARY

The subject matter described herein includes methods, systems, and computer readable media for automated generation of test files and for related testing. One method includes receiving a configuration file, where the configuration file indicates a test case or a test plan to be generated, wherein the configuration file includes a feature identifier or a bug identifier and information about a system under test (SUT). The method also includes generating at least one test file based on the configuration file, wherein the at least one test file is for testing a feature or a bug in the SUT associated with the feature identifier or the bug identifier in the configuration file. The method further includes generating at least one directory based on the configuration file and storing the at least one test file in the at least one directory. The method also includes testing the feature or bug in the SUT using the at least one test file.

A system for automated test file generating and for related testing includes at least one processor and a test file generator. The test file generator is implemented using the at least one processor. The test file generator is configured to receive a configuration file, where the configuration file indicates a test case or a test plan to be generated, wherein the configuration file includes a feature identifier or a bug identifier and information about a SUT, to generate at least one test file based on the configuration file, wherein the at least one test file is for testing a feature or a bug in the SUT associated with the feature identifier or the bug identifier in the configuration file, to generate at least one directory based on the configuration file, and to store the at least one test file in the at least one directory. The system further includes a test controller for testing the feature or bug in the SUT using the at least one test file.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a non-transitory computer readable medium that implements the subject matter described herein may be located on a single device or computing platform or may be distributed across multiple devices or computing platforms.

As used herein, the term "node" refers to at least one physical computing platform including one or more processors and memory. For example, a node may include a virtual machine and/or software executing on a physical computing platform.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIGS. 6A-6C depict test file information according to an embodiment of the subject matter described herein.

DETAILED DESCRIPTION

The subject matter described herein relates to methods, systems, and computer readable media for automated test file generation and testing bugs or features of devices using the files. Network equipment testing generally requires meticulous yet tedious attention to detail. For example, a quality assurance group for a software company may need to test thousands of features and millions of lines of code, prior to the release of a new product, feature, or even updated software. While various testing suites can provide tools that make testing more automated and generally more efficient, issues can arise, e.g., when the tools require some user provided data to be entered in arcane and/or potentially confusing formats. For example, a design verification tool for a certain product (e.g., a telecommunications network router, such as a Diameter signaling router) may utilize a configuration file written using a particular data format known as timed text markup language (TTML). In this example, TTML, which is similar to extensible markup language (XML), may be structured such that data, including metadata, must be encoded between start and end tags. As such, formatting and/or data entry errors associated with these files may be common, which can significantly delay testing if a test tool is unable to use invalid or improperly formatted test files.

In accordance with some aspects of the subject matter described herein, techniques, methods, or mechanisms are disclosed for automated test file generation. For example, a test file generator described herein may utilize a user-provided configuration file in an easy-to-parse and/or human-readable data format, such as initialization (INI) file format, to generate one or more test files containing metadata. In some embodiments, a test file generator described herein may also generate one or more directories for storing generated test files based on a user-provided configuration file.

Advantageously, in accordance with some aspects of the subject matter described herein, by using an easy-to-parse and/or human readable configuration file when generating test files, directories, dependent files, and test related metadata, test related efficiency may be increased and time and resources associated with testing may be reduced.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
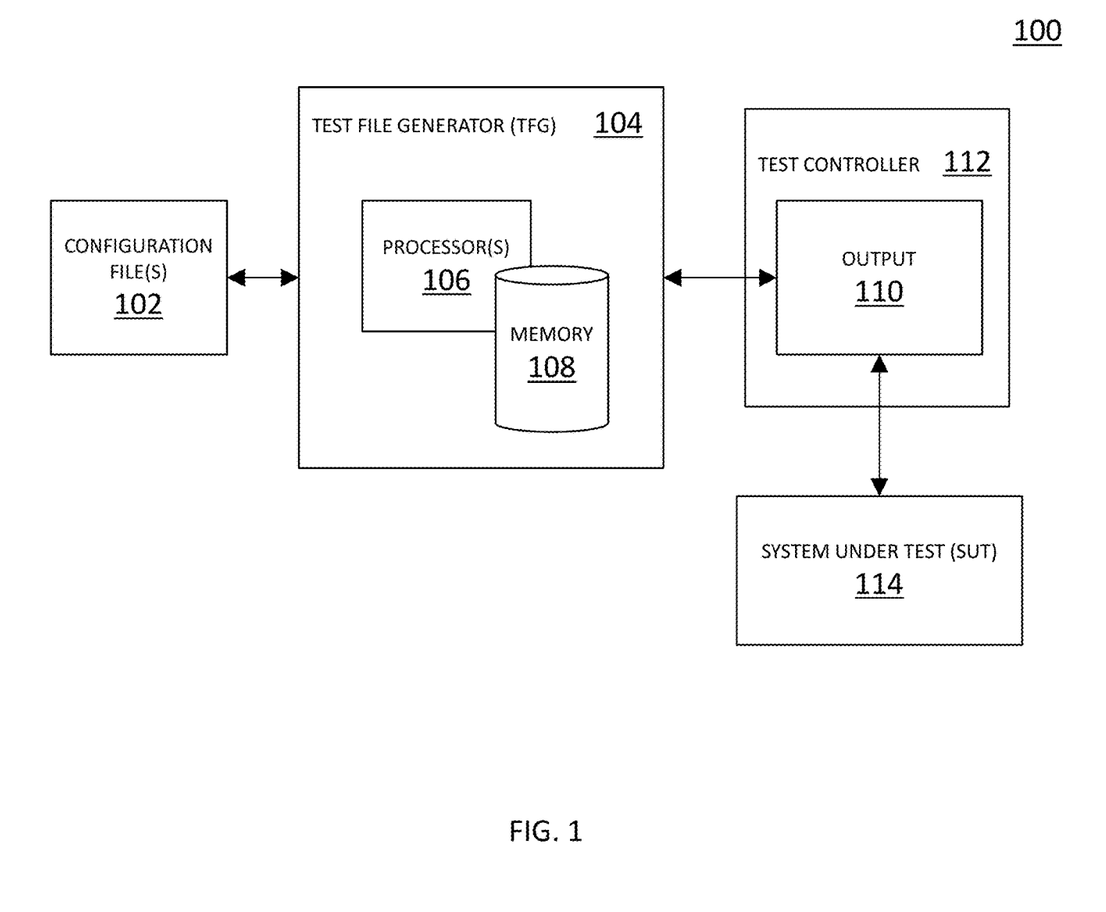
FIG. 1 is a block diagram illustrating a computing environment for automated test file generation and testing devices using the test files according to an embodiment of the subject matter described herein.

FIG. 1 is a block diagram illustrating a computing environment 100 for automated test file generation and for testing network devices using automatically generated test files according to an embodiment of the subject matter described herein. In some embodiments, computing environment 100 may include one or more nodes or devices. Referring to FIG. 1, computing environment 100 may include one or more configuration file(s) 102, a test file generator 104, output 110, a test controller 112, and a system under test (SUT) 114.

Configuration file(s) 102 may represent any file usable for generating and/or configuring a test file. In some embodiments, configuration file(s) 102 may be human readable and/or easy-to-parse. For example, configuration file(s) 102 may use an INI file format, an XML based file format, or a comma-separated values (CSV) file format. In this example, configuration file(s) 102 may use keys, optionally grouped into one or more sections, to store values, text, uniform resource locators (URLs), bug identifiers feature identifiers, directory information, system under test (SUT) related information, and metadata describing various test related aspects.

In some embodiments, configuration file(s) 102 may be generated and provided to test file generator 104 via a communications interface and/or a user interface, e.g., an application user interface (API) and a graphical user interface (GUI). Example user interfaces for configuring and/or using test file generator 104 may support automation (e.g., via one or more scripting languages) and may include a representation state transfer (REST) API, a command line, and/or a web based GUI.

Test file generator 104 may represent any suitable entity (e.g., a node, a testing platform, and/or one or more processors executing software) for performing one or more aspects associated with test file generation. In some embodiments, test file generator 104 may be configured to utilize configuration file(s) 102 and/or predetermined or preprogrammed information (e.g., test file templates) to generate output 110. For example, output 110 may be one or more test files for testing features and/or bugs associated with SUT 114.

Test file generator 104 may include and/or access one or more processor(s) 106 and memory 108. Processor(s) 106 may represent any suitable entity or entities (e.g., one or more physical or hardware implemented processors) for executing software (e.g., executable instructions). Memory 108 may represent any suitable entity (e.g., a non-transitory computer readable medium, embedded memory, or a memory device) for storing data associated with automated test file generation.

Example data in memory 108 may include one or more test file templates, user preferences, and/or software (e.g., computer executable instructions) associated with one or more modules or algorithms for performing at least some functionality described herein. For example, test file generator 104 may include one or more modules (e.g., software executing on processor(s) 106) and/or algorithms (e.g., software and/or logic) that perform various functions associated with test file generation, such as a test file generator 104 for generating test files using test file templates and/or configuration file(s) 102.

In some embodiments, test file generator 104 may receive configuration file(s) 102, may generate output 110 (e.g., at least one test file and/or at least one directory) using configuration file(s) 102 and/or other information, and may store output 110 in one or more directories. In another example, test file generator 104 may generate output 110 using test file templates and/or other information and may store output 110 in one or more directories.

In some embodiments, output 110 may include one or more directories, test files, and/or other files. For example, output 110 may include generating a feature test plan for testing a feature or a bug test case for testing whether a bug (e.g., software issue or error) is resolved. In another example, output 110 may include generating a base directory and one or more subdirectories for storing generated test files or other files associated with testing.

In some embodiments, a test file may be written using a TTML file format, an XML based file format, and/or another file format. For example, a test file may be stored as a TTML file capable of being executed or utilized by a testing platform or related software. In this example, the test file may be capable of being parsed to initiate various test related actions and may include metadata for describing aspects of the test file and/or test related actions.

In some embodiments, a test file may include or define a test case indicating one or more test related actions to be performed on SUT 114 (e.g., a product feature, a product, and/or software of SUT 114) and metadata related to the test case. For example, a test case file may include metadata for describing one or more test related actions, e.g., SUT related information, reference URLs, and/or bug related information. In some embodiments, a test case file may be referenced or used as a component of a test plan. For example, a test case may test a certain type of input for a feature of SUT. In another example, a bug test case may test SUT 114 for determining whether a bug is resolved.

In some embodiments, a test file may include or define a test plan indicating one or more test cases to be executed for testing SUT 114 and metadata related to the test plan. For example, a test plan file may include metadata for describing a test process, test requirement information, bug and/or feature related information, and various other elements. In some embodiments, a test plan file may act as a wrapper file which references and/or calls one or more test cases. For example, a test plan file may define a number of test cases that perform specific actions on SUT 114. In this example, the test cases or actions therein may represent the actual test and verification may be performed based on the output of those actions.

Test controller 112 may represent any suitable entity (e.g., a node, a testing platform, and/or one or more processors executing software) for performing one or more aspects associated with testing aspects of SUT 114. In some embodiments, test controller 112 may be configured to utilize output 110 from test file generator 104 to generate one or more test scripts and/or perform testing related actions. For example, test controller 112 may use one or more test files for testing features and/or bugs associated with SUT 114.

In some embodiments, test controller 112 may convert output 110 (e.g., a TTML file) to additional formats, files, and/or software logic. For example, test controller 112 may convert information in a TTML file into a different data format (e.g., a test script written in PHP or Perl) for testing a particular network device or aspect of SUT 114. In this example, test controller 112 may executes the TTML file or a related file (e.g., a test script based on the TTML file) to test SUT 114, such as by exchanging a sequence of data packets via one or more communications interfaces between test controller 112 and SUT 114. In some embodiments, test controller 112 may monitor and report the response and/or state of SUT 114, e.g., during and after testing, to determine whether the test is successful.

SUT 114 may represent any suitable entity or entities (e.g., a node, network equipment, a switch, a router, and/or a Diameter signaling agent) for testing by test controller 112. For example, SUT 114 may include one or more network devices or components and/or software therein. In another example, SUT 114 may include a network node, a network device, a Diameter signaling agent, a platform distribution system, a virtual operating environment, a platform management and configuration system, and/or an operating system.

In some embodiments, SUT 114 may be configured to perform one or more actions in response to or based on interactions with test controller 112. In such embodiments, the interactions with test controller 112 and/or resulting actions may be associated with output 110 (e.g., an automated test file) generated by test file generator 104 and may be usable for testing a bug or feature associated with SUT 114.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

Figure 2A:
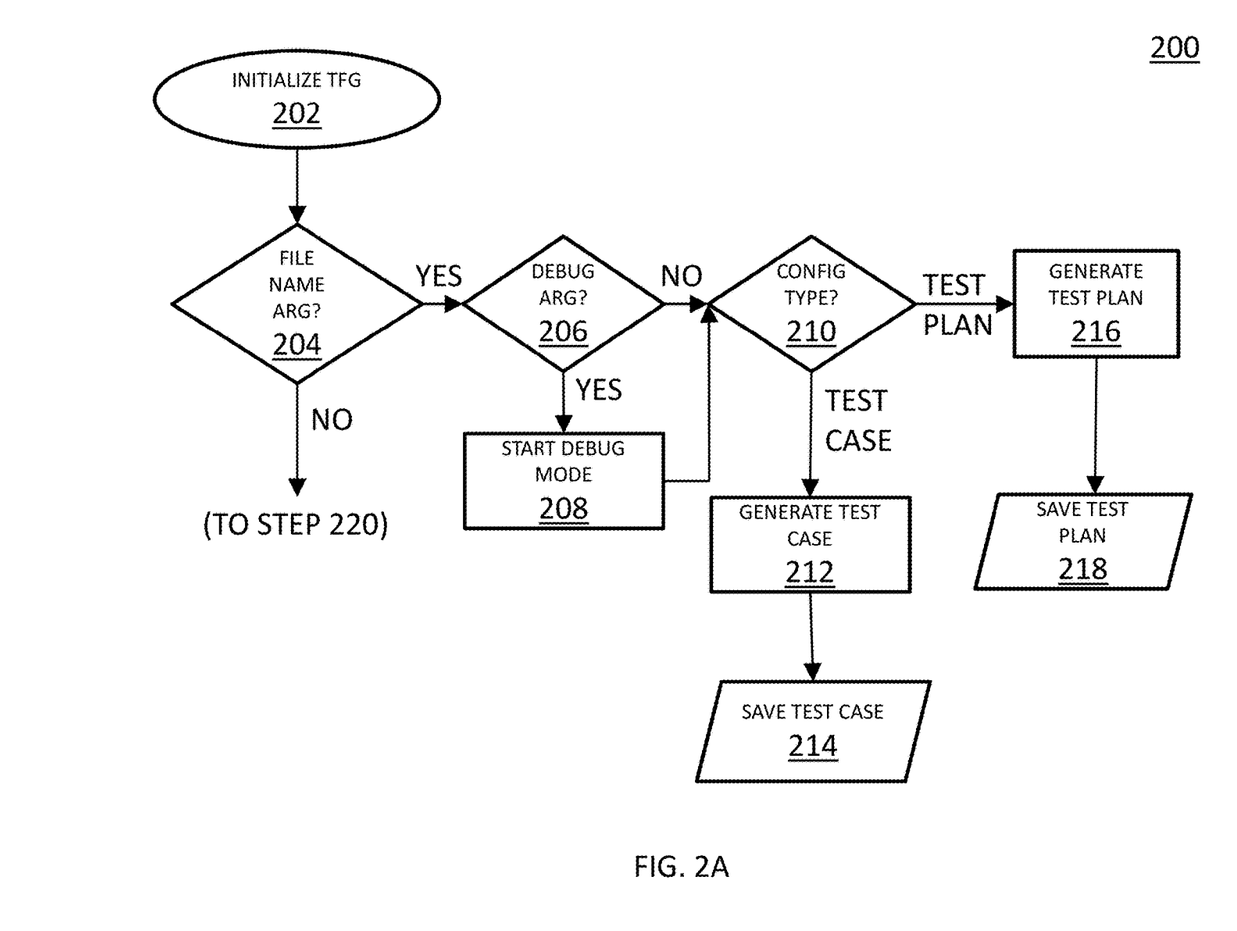
FIGS. 2A-2B depict a process diagram associated with automated test file generation according to an embodiment of the subject matter described herein.
Figure 2B:
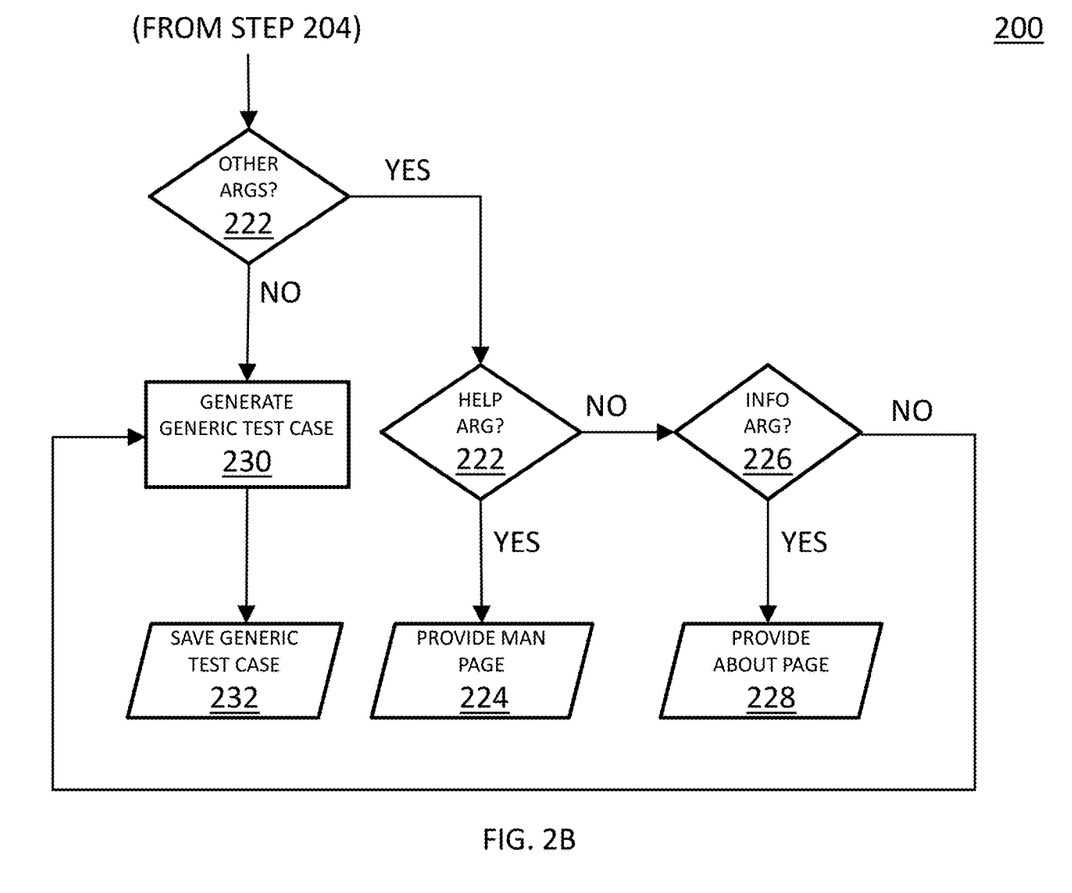

FIG. 2 is a process diagram 200 associated with test file generation according to an embodiment of the subject matter described herein. In some embodiments, test file generator 104 may perform various functions or steps, including parsing test file generation related arguments (e.g., command line arguments) and/or utilizing information in configuration file(s) 102, when generating one or more test files. In some embodiments, test file generation related arguments and/or configuration file(s) 102 may affect and/or determine output 110 and/or other functions associated with test file generator 104.

Referring to FIG. 2A, in step 202, test file generator 104 may be initialized or executed. For example, test file generator 104 may include or utilize a binary file (e.g., an .exe file or a .bin file) and/or software program that are executed via a user interface, e.g., command line interface (CLI) or graphical user interface (GUI). In some embodiments, during initialization and/or execution, test file generator 104 may receive a pathname or other identifier associated with configuration file(s) 102 and/or one or more test file generation related arguments. Example test file generation related arguments may include a filename argument, a debug argument, a help (e.g., usage) argument, and an information (e.g., version) argument. For example, at a CLI, a user may type "test_file_generator.exe-filename='C:\tester\Test4.cfg'—debug".

In step 204, test file generator 104 may determine whether a filename argument is provided (e.g., by the user). If a filename argument is provided, step 206 may be performed. If a filename argument is not provided, step 220 may be performed.

In step 206, test file generator 104 may determine whether a debug argument is provided (e.g., by the user). If a debug argument is provided, step 208 may be performed. If a debug argument is not provided, step 210 may be performed.

In step 208, test file generator 104 may perform additional steps, e.g., starting in step 210, in a debug mode. For example, in a debug mode, test file generator 104 may generate a log file or provide feedback (via a standard output) to a user about its internal state and/or various processing steps. In this example, the user may be able to diagnose issues associated with test file generator 104 based on feedback provided in the debug mode.

In step 210, test file generator 104 may process and/or parse configuration file(s) 102 and may determine whether configuration file(s) 102 is associated with testing a bug or a feature. If configuration file(s) 102 is associated with testing a bug, step 212 may be performed. If configuration file(s) 102 is associated with testing a feature, step 216 may be performed.

In step 212, test file generator 104 may process and/or parse configuration file(s) 102 and may generate a bug test case based on information in configuration file(s) 102. After step 212 is performed, step 214 may be performed.

In step 214, test file generator 104 may save or store the generated bug test case in a TTML file. For example, a generated bug test case may be named 'bug_4564_testcase.ttml' and may be saved in a current directory or a directory indicated by configuration file(s) 102.

In step 216, test file generator 104 may process and/or parse configuration file(s) 102 and may generate a feature test plan based on information in configuration file(s) 102. After step 216 is performed, step 218 may be performed.

In step 218, test file generator 104 may save or store the generated feature test plan in a TTML file and may save the test plan in a base directory. In some embodiments, test file generator 104 may generate subdirectories and additional test related files (e.g., TTML files for testing valid input and invalid input). Additional details regarding files and subdirectories generated during an example test plan is discussed below with regard to FIG. 3.

Referring to FIG. 2B, in step 220, test file generator 104 may determine whether one or more other arguments are provided (e.g., by the user). If another argument is provided, step 222 may be performed. If another argument is not provided, step 230 may be performed.

In step 222, test file generator 104 may determine whether a help argument (e.g., a 'man' or 'usage' argument) is provided (e.g., by the user). If a help argument is provided, step 224 may be performed. If a help argument is not provided, step 226 may be performed.

In step 224, test file generator 104 may display or provide usage information (e.g., a manual (man) page) for indicating how to use test file generator 104 and information about various options, settings, or arguments usable for configuring test file generator 104.

In step 226, test file generator 104 may determine whether an information argument (e.g., a 'version' or 'about' argument) is provided (e.g., by the user). If an information argument is provided, step 228 may be performed. If an information argument is not provided, step 230 may be performed.

In step 228, test file generator 104 may display or provide information (e.g., an about page) about test file generator 104, e.g., software version number, an author, and/or a release date.

In step 230, test file generator 104 may generate a generic test case, e.g., without using configuration file(s) 102. For example, a generic test case may be based on a stored template or shell from memory 108 and may include generic metadata or no metadata. After step 230 is performed, step 232 may be performed.

In step 232, test file generator 104 may save or store the generated generic test case in a TTML file and may save the test plan in a current directory or a base directory.

It will be appreciated that process diagram 200 is for illustrative purposes and that different and/or additional actions or steps than those described above with regard to FIGS. 2A-2B may be performed by test file generator 104. It will also be appreciated that various actions or steps described herein may occur in a different order or sequence than described above with regard to FIGS. 2A-2B.

Figure 3:
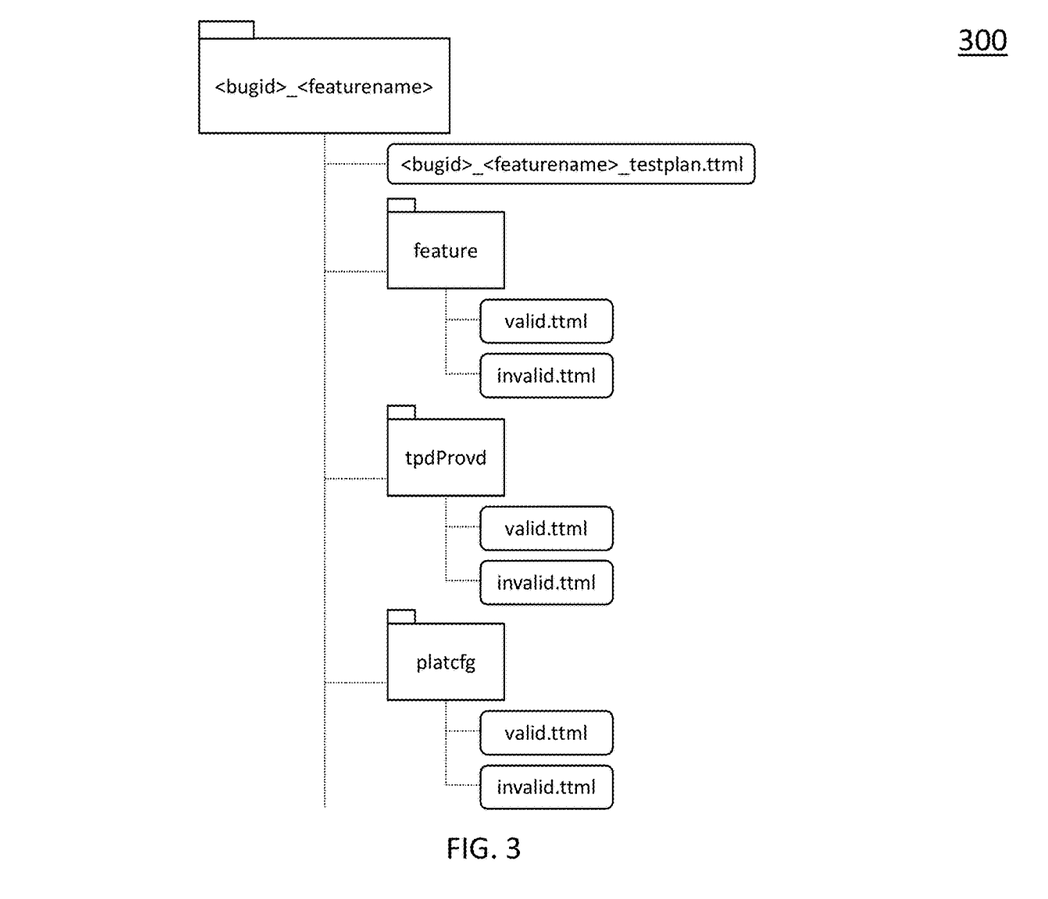
FIG. 3 is a tree diagram illustrating generated test files and directories according to an embodiment of the subject matter described herein.

FIG. 3 is a tree diagram 300 illustrating generated test files and directories according to an embodiment of the subject matter described herein. In some embodiments, test file generator 104 may generate multiple test files and/or directories related to a test plan. In some embodiments, test file generator 104 may generate and name test files and/or directories based on a variety of factors, e.g., preconfigured or preprogrammed information, historical information, information in configuration file(s) 102, user provided information, and/or user preferences.

Referring to FIG. 3, tree diagram 300 may represent a folder and file structure generated or created based on configuration file(s) 102 associated with a feature test plan. As depicted in FIG. 3, a first directory, also referred to as a base directory (e.g., 'Bug78_F143'), may be named based on a bug identifier (e.g., 'Bug78') and a feature name (e.g., 'F143') indicated in a related configuration file. The base directory may include a TTML file (e.g., 'Bug78_F143_testplan.ttml') with a similar name and containing the generated feature test plan.

In some embodiments, the base directory may include multiple subdirectories, where each subdirectory may include test files for testing to a different aspect of a feature or a related software and/or hardware component of SUT 114. For example, tree diagram 300 may include a 'feature' subdirectory for testing a feature associated with SUT 114, a 'tpdProvd' subdirectory for testing provisioning associated with SUT 114, and a 'platcfg' subdirectory for testing platform configuration associated with SUT 114.

In some embodiments, each subdirectory may include a TTML file (e.g., 'valid.ttml') containing data that should be determined as valid when used as input in testing and a TTML file (e.g., 'invalid.ttml') containing data that should be determined as invalid when used as input in testing.

It will be appreciated that tree diagram 300 is for illustrative purposes and that different and/or additional folders and files than those described above with regard to FIG. 3 may be generated by test file generator 104 depending on various factors, user provided information, and/or configuration information.

Figure 4:
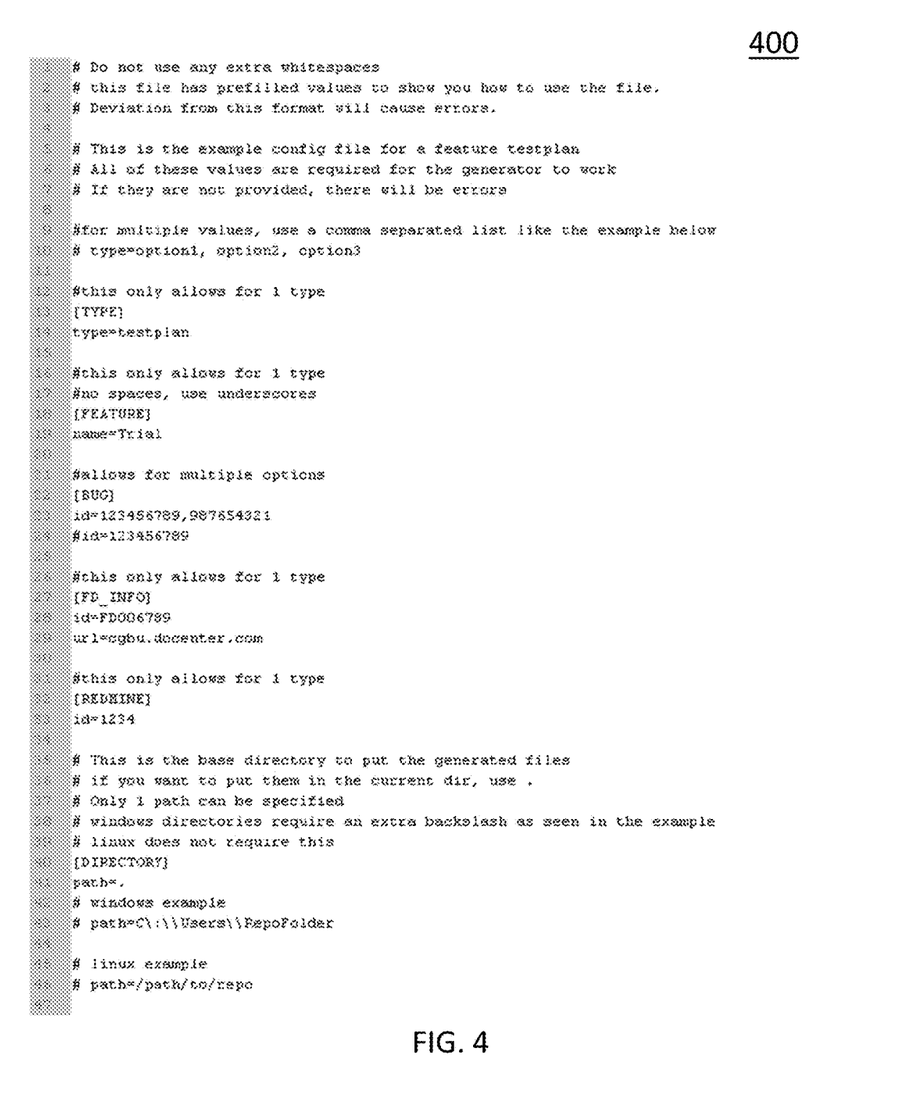
FIG. 4 is a diagram illustrating test configuration information associated with a feature according to an embodiment of the subject matter described herein.

FIG. 4 is a diagram illustrating test configuration information 400 associated with a feature test plan according to an embodiment of the subject matter described herein. In some embodiments, test file generator 104 may use different configuration files 102 to generate different test files. For example, configuration file(s) 102 associated with a feature may be usable to generate a test file containing a feature test plan.

Referring to FIG. 4, test configuration information 400 may include comments or metadata which may be ignored or not utilized by test file generator 104. For example, as depicted in lines 1-3 of FIG. 4, comments may be represented by lines of text starting with a pound character '#'.

In some embodiments, test configuration information 400 may include multiple keys or properties, where each key may be represented by a name and at least one value separated by an equal sign. For example, as depicted in line 14 of FIG. 4, 'type=testplan' may represent a key having name 'type' and a value 'testplan'. In another example, as depicted in line 23 of FIG. 4, 'id=123456789,987654321' may represent a key having a name 'id' and two values '123456789' and '987654321'.

In some embodiments, test configuration information 400 may group one or more keys into a section (e.g., groupings of keys) using a section declaration. Each section declaration may be represented by text between square brackets (e.g., [sectionname]). For example, as depicted in line 13 of FIG. 4, '[TYPE]' may represent the start of a section named 'TYPE' for indicating keys associated with a test file type and may appear prior to keys that are to be associated with this section, e.g., the 'type=testplan' key on line 14 of FIG. 4. In some embodiments, a section may end explicitly (e.g., using an 'end of section' declaration or tag) or implicitly (e.g., a new section declaration or the end of configuration file(s) 102).

In some embodiments, test configuration information 400 may include a 'TYPE' section for one or more keys (e.g., an 'type' key) associated with a test file type to be generated, a 'FEATURE' section for one or more keys (e.g., a 'name' key) associated with a feature to be tested, a 'BUG' section for one or more keys (e.g., an 'id' key) associated with one or more bugs to be tested, a 'FD_INFO' section for one or more keys (e.g., an 'id' key and/or a 'url' key) associated with one or more FD documents (e.g., functional specifications) associated with the feature to be tested, a 'DIRECTORY' section for one or more keys (e.g., a 'path' key) indicating one or more directories (e.g., a base directory and/or subdirectories) for storing generated test files, and/or one or more other sections, such as a 'REDMINE' section.

It will be appreciated that test configuration information 400 is for illustrative purposes and that different and/or additional formatting and/or data than described above with regard to FIG. 4 may be usable by test file generator 104. It will also be appreciated that comments depicted in FIG. 4 are for illustrative purposes and are not to be construed as limitations of test file generator 104 or functionality therein.

Figure 5:
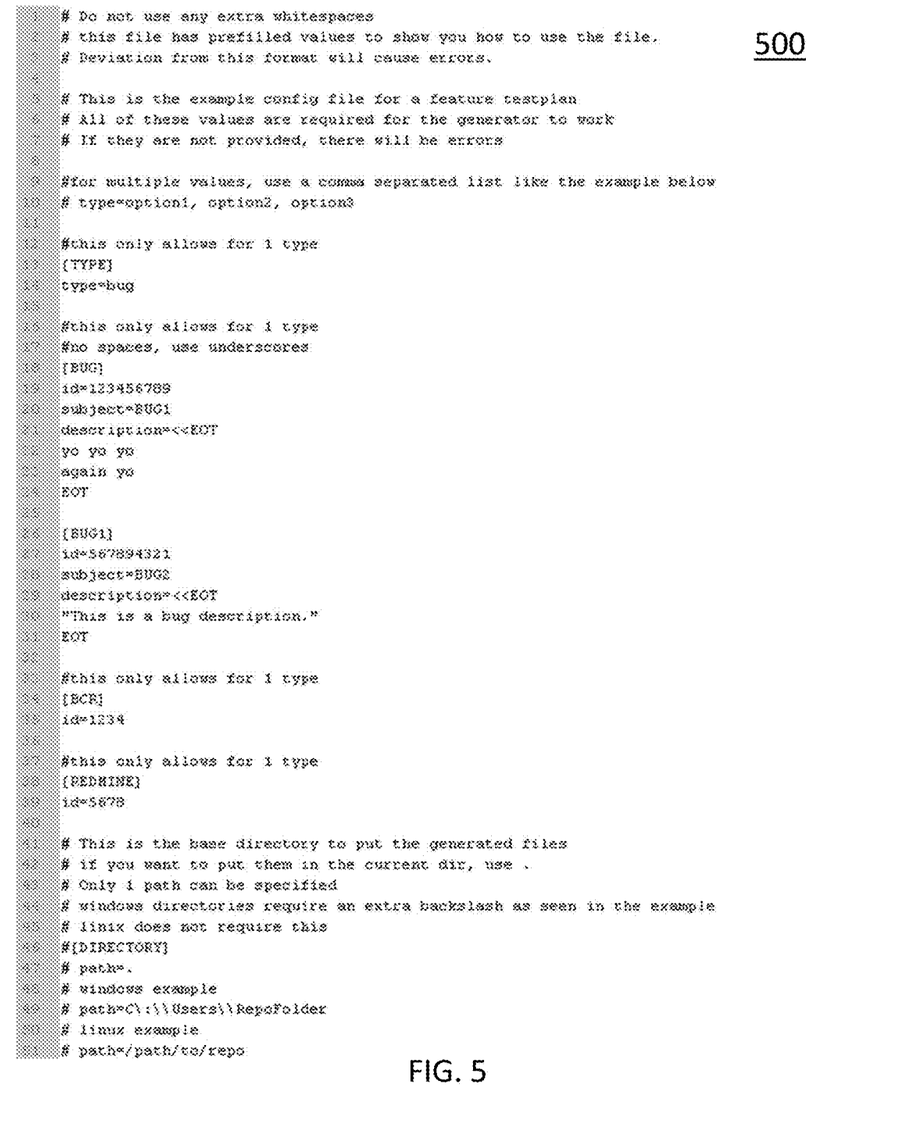
FIG. 5 is a diagram illustrating test configuration information associated with a bug according to an embodiment of the subject matter described herein.

FIG. 5 is a diagram illustrating test configuration information 500 associated with a bug according to an embodiment of the subject matter described herein. In some embodiments, test file generator 104 may use different configuration files 102 to generate different test files. For example, configuration file(s) 102 associated with a feature may be usable to generate a test file containing a bug test case.

Referring to FIG. 5, test configuration information 500 may include comments or metadata which may be ignored or not utilized by test file generator 104. For example, as depicted in lines 1-3 of FIG. 5, comments may be represented by lines of text starting with a pound character '#'.

In some embodiments, test configuration information 500 may include multiple keys or properties, where each key may be represented by a name and at least one value separated by an equal sign. For example, as depicted in line 14 of FIG. 5, 'type=bug' may represent a key having name 'type' and a value 'bug'. In another example, as depicted in line 19 of FIG. 5, 'id=123456789' may represent a key having a name 'id' and a value '123456789'.

In some embodiments, test configuration information 500 may group one or more keys into a section using a section declaration. Each section declaration may be represented by text between square brackets (e.g., [sectionname]). For example, as depicted in line 13 of FIG. 5, '[TYPE]' may represent the start of a section named 'TYPE' for indicating keys associated with a test file type and may appear prior to keys that are to be associated with this section, e.g., the 'type=bug' key on line 14 of FIG. 5. In some embodiments, a section may end explicitly (e.g., using an 'end of section' declaration or tag) or implicitly (e.g., a new section declaration or the end of configuration file(s) 102).

In some embodiments, test configuration information 500 may include a 'TYPE' section for one or more keys (e.g., an 'type' key) associated with a test file type to be generated, a 'BUG' section for one or more keys (e.g., an 'id' key, a 'subject' key, and/or a 'description' key) associated with one or more bugs to be tested, a 'BUG1' section for one or more keys (e.g., an 'id' key, a 'subject' key, and/or a 'description' key) associated with a particular bug, a 'DIRECTORY' section for one or more keys (e.g., a 'path' key) indicating one or more directories (e.g., a base directory and/or subdirectories) for storing generated test files, and/or one or more other sections, such as a 'BCR' section and a 'REDMINE' section for indicating one or more tasks or actions associated with testing the feature.

It will be appreciated that test configuration information 500 is for illustrative purposes and that different and/or additional formatting and/or data than described above with regard to FIG. 5 may be usable by test file generator 104. It will also be appreciated that comments depicted in FIG. 5 are for illustrative purposes and are not to be construed as limitations of test file generator 104 or functionality therein.

Figure 6A:
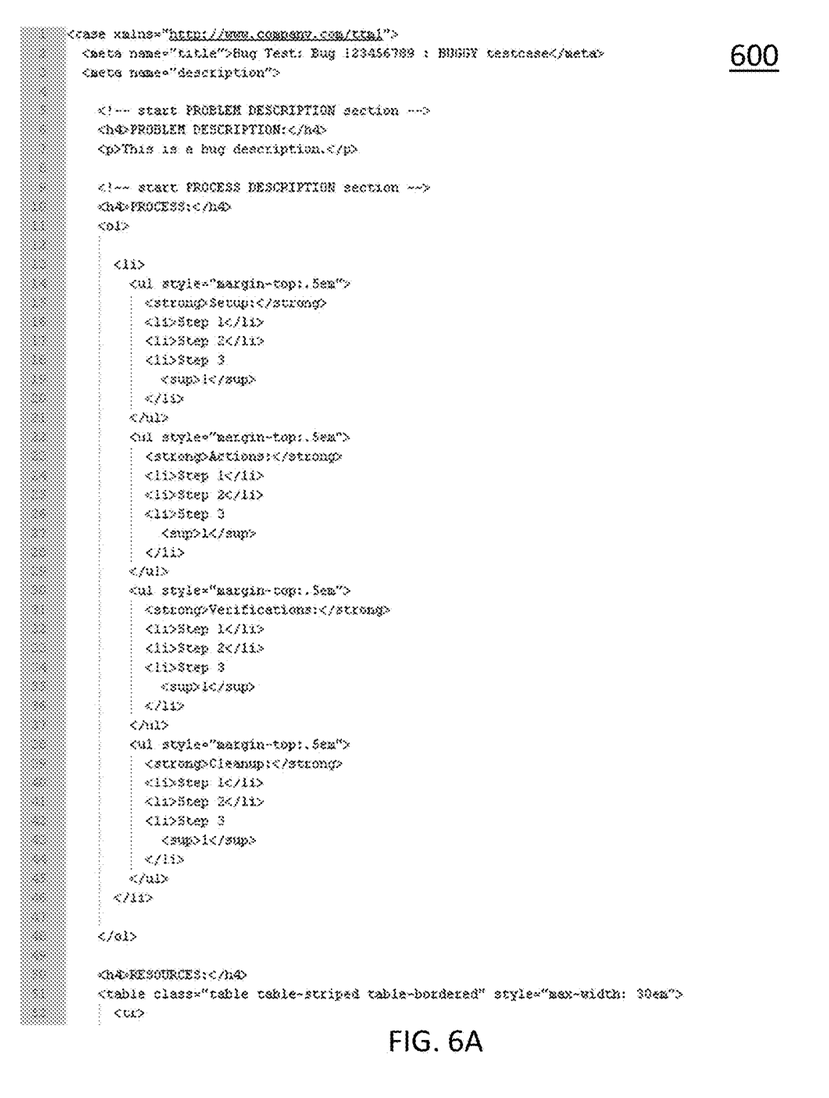

FIGS. 6A-6C depict test file information 600 according to an embodiment of the subject matter described herein. In some embodiments, test file generator 104 may generate various test files. For example, test file generator 104 may generate a test file that includes a feature test plan or a bug test case.

Referring to FIGS. 6A-6C, test file information 600 may represents portions of a TTML file containing information about a bug test case. Test file information 600 may include multiple portions, including a header or metadata portion (e.g., starting at line 2 of FIG. 6A and ending on line 85 of FIG. 6B) containing one or more '<meta . . . >' tags for indicating various information about the test case, a parameters portion (e.g., starting at line 87 of FIG. 6B and ending on line 90 of FIG. 6B) containing one or more '<parameter . . . >' tags for indicating test parameters and SUT related information, and a body portion (e.g., starting at line 92 of FIG. 6B and ending on line 155 of FIG. 6C) containing one or more '<variable . . . >' tags, '<meta . . . >' tags, '<assert . . . >' tags, '<action . . . >' tags, '<call . . . >' tags, and other tags or data for defining and describing various actions for testing an bug associated with SUT 114.

In some embodiments, test file information 600 may include comments or metadata which may be ignored or not utilized by a testing platform or testing software. For example, as depicted in line 5 of FIG. 6A, a comment may be represented by a line of text between angled brackets, e.g., lines starting with a 'less than' character and an exclamation point character '<!' and ending with a 'greater than' character '>'.

In some embodiments, test file information 600 may include values, text, layout, formatting, and/or other information that is predetermined or preprogrammed in test file generator 104. For example, as depicted in FIG. 6A, various hypertext markup language (HTML), XML and/or TTML tags (e.g., '<case . . . >', '<meta . . . >', '<h4>', '<ul>', '<li>', '<table . . . >', '<tr>', etc.) for structuring test related information and/or a test file template containing default information (e.g., metadata and/or comments) may be stored in memory 108. In this example, test file generator 104 may use this stored information along with other data in configuration file(s) 102 to generate one or more test files. In another example, test file generator 104 may use a test file template and/or other predetermined information to generate a generic test case without using configuration file(s) 102.

In some embodiments, test file information 600 may use configuration file(s) 102 and/or predetermined information to generate and format metadata and/or comments. For example, when generating a TTML file, test file generator 104 may use '<meta . . . >' tags for storing at least some metadata obtained from information in configuration file(s) 102, such as a title and a description for the test case. In this example, test file generator 104 may use HTML formatting (e.g., based on a stored test file template for bug test cases) for displaying metadata in sections (e.g., headings), lists, and/or tables. In some embodiments, e.g., depicted in FIGS. 6A-6B, a metadata description portion of a test file may be HTML formatted and may include a 'PROBLEM DESCRIPTION' section for indicating a problem (e.g., bug) to be tested, a 'PROCESS' section for indicating actions to be performed during testing, a 'RESOURCES' section for indicating one or more URLs for obtaining additional information about the bug and/or SUT to be tested, a 'NOTES' section for indicating test observations or other information about testing the bug and/or SUT, and/or a 'TAGS' section for indicating one or more terms that may be indexable or searchable for various purposes, e.g., testing analytics and/or reporting.

In some embodiments, test file information 600 may use configuration file(s) 102 and/or predetermined information to generate and format test related parameters. For example, when generating a TTML file, test file generator 104 may use '<parameter . . . >' tags for storing at least some SUT related information obtained from configuration file(s) 102, such as a name and type of SUT 114, e.g., device under test (DUT). In this example, test file generator 104 may also use information from the test configuration to describe one or more parameters.

In some embodiments, e.g., as depicted in FIG. 6B, a parameters portion of a test file may include a '<param- eter . . . >' tag for indicating information about a DUT or SUT and a '<parameter . . . >' tag for indicating testing options, e.g., which parts of a test case to execute.

In some embodiments, test file information 600 may use configuration file(s) 102 and/or predetermined information to generate and format actions, values, and/or test related information. For example, when generating a TTML file, test file generator 104 may use '<variable . . . >' tags, 'assert . . . ' tags, 'if' statements, '<call . . . >' tags, 'action . . . ' tags, '<metadata . . . >' tags, and/or other information for representing, describing, and defining various test related actions. In this example, test file generator 104 may also use information from the test configuration to describe or define test related actions.

In some embodiments, a body portion of a test file may include one or more 'if' statements or conditional logic, wherein if the conditions are met, various actions, e.g., executing functions, initializing variables, and/or logging features, are performed. For example, a body portion of a test file may indicate various software or logic based checks, e.g., '!empty($varName)', to determine whether a variable is not empty and may also indicate expected values of the checks.

In some embodiments, a body portion of a test file may include one or more '<call . . . >' tags for calling or referencing one or more actions or related test case files that may be executed or performed.

In some embodiments, a body portion of a test file may include one or more '<return . . . >' tags for returning an output to an executed test case or portion thereof.

It will be appreciated that test file information 600 is for illustrative purposes and that different and/or additional formatting and/or data than described above with regard to FIG. 6 may be usable for testing. For example, a generated test file may use any viable data format, communications protocol, and/or communications medium. It will also be appreciated that comments depicted in FIG. 6 are for illustrative purposes and are not to be construed as limitations.

Figure 7:
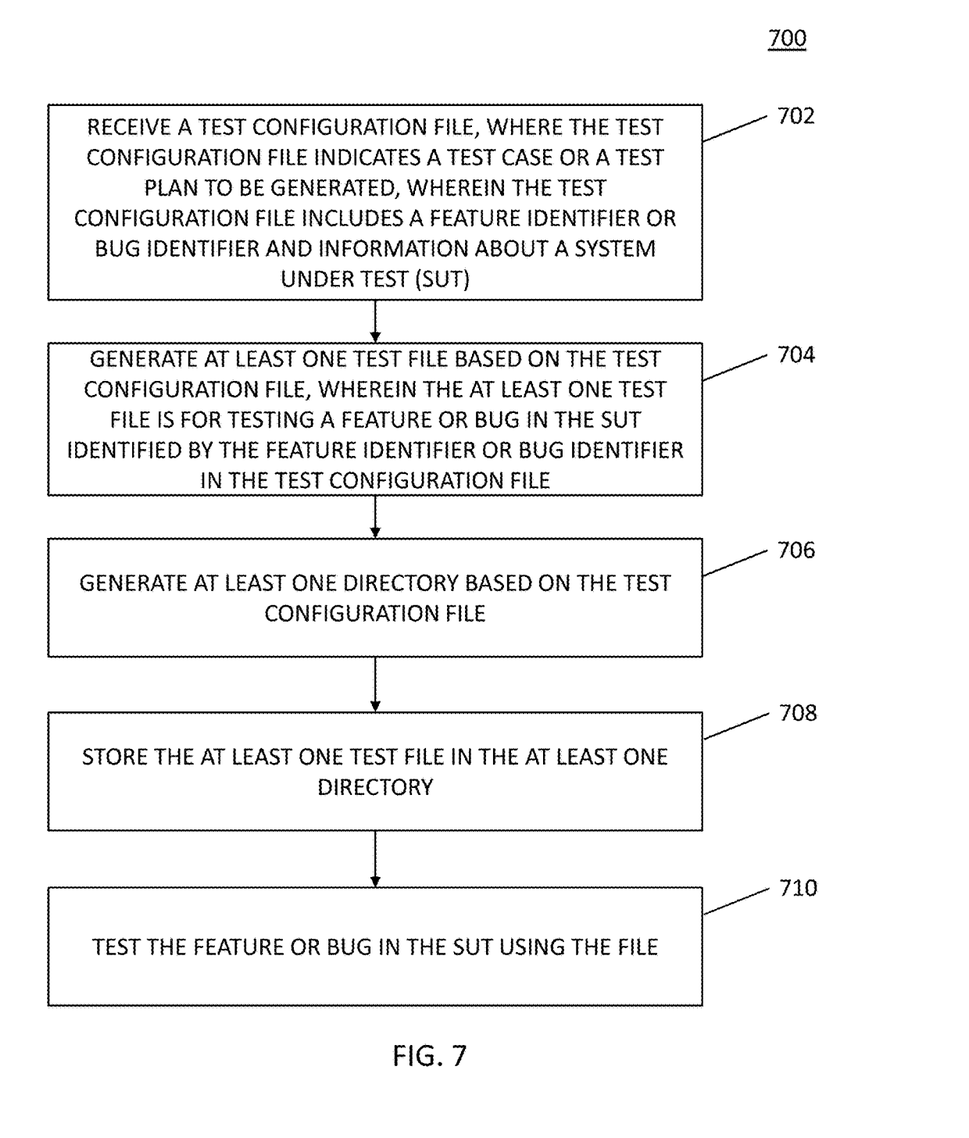
FIG. 7 is a flow chart illustrating a process for automated test file generation and related testing according to an embodiment of the subject matter described herein.

FIG. 7 is a flow chart illustrating a process for automated test file generation and related testing according to an embodiment of the subject matter described herein. In some embodiments, process 700, or portions thereof (e.g., steps 702, 704, 706, 708, and/or 710), may be performed by or at test file generator 104, test file generator 104, test controller 112, and/or another node or module.

Referring to process 700, in step 702, configuration file(s) 102 may be received. In some embodiments, configuration file(s) 102 may indicate a test case or a test plan to be generated and configuration file(s) 102 may include a feature identifier or a bug identifier and information about SUT 114. For example, configuration file(s) 102 may be received by test file generator 104. In this example, configuration file(s) 102 may include a name or other identifier (e.g., 'Trial' as indicated in FIG. 4) associated with a feature and may indicate various data about a system to be tested, e.g., an operating system type or a version number of a particular feature.

In step 704, at least one test file may be generated based on configuration file(s) 102. In some embodiments, the at least one test file may be for testing a feature or a bug in SUT 114 associated with the feature identifier or the bug identifier in configuration file(s) 102. For example, a feature test plan file may be generated as a TTML file by test file generator 104. In this example, the TTML file may indicate a list of test cases and/or actions that are to be performed for testing SUT 114.

In step 706, at least one directory may be generated based on configuration file(s) 102. For example, test file generator 104 may generate a directory for storing a test case in a base directory indicated in configuration file(s) 102 (e.g., FIG. 5, line 49).

In step 708, the at least one test file may be stored in the at least one directory. For example, test file generator 104 may store a feature test plan file in a directory named based on a bug identifier and/or a feature name indicated in the feature test plan file.

In step 710, the feature or bug in SUT 114 may be tested using the file. For example, test controller 112 may be configured to use test files for testing one or more aspects of SUT 114 as defined in the test files.

In some embodiments, configuration file(s) 102 may use an INI file format.

In some embodiments, configuration file(s) 102 may include metadata for describing a test process, test requirements, bug information, or feature information.

In some embodiments, SUT 114 may include a network node, a network device, a Diameter signaling agent, a platform distribution system, a virtual operating environment, a platform management and configuration system, or an operating system.

In some embodiments, at least one test file may use an XML based file format or a TTML file format.

In some embodiments, at least one test file may include a test plan including one or more test cases.

In some embodiments, at least one test file may include a test case including one or more actions for SUT 114 to perform.

In some embodiments, at least one test file and at least one directory (e.g., generated by test file generator 104) may be named using information stored in configuration file(s) 102.

In some embodiments, storing at least one test file in at least one directory may include storing a first test file in a first directory and storing, in a first subdirectory of the first directory, a second test file containing valid input for testing and a third test file containing invalid input for testing.

It will be appreciated that process 700 is for illustrative purposes and that different and/or additional actions may be used. It will also be appreciated that various actions described herein may occur in a different order or sequence.

It should be noted that test file generator 104, test file generator 104, and/or functionality described herein may constitute a special purpose computing device. Further, test file generator 104, test file generator 104, and/or functionality described herein can improve the technological field of computer and software testing by using techniques, methods, and/or mechanisms that automate the creation of test files and related directories, including subdirectories and dependent files, and that automate the creation of test related metadata, thereby saving time and resources associated with test file creation and also decreasing test file related errors.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automated generation of test files and for related testing, the method comprising:

at a test file generator, wherein the test file generator is implemented using the at least one processor, wherein the test file generator is configured for automating the generation of directories for storing test files based on a configuration file:

receiving the configuration file, where the configuration file indicates a test case or a test plan to be generated, wherein the configuration file includes a feature identifier or a bug identifier and information about a system under test (SUT), wherein the configuration file includes a plurality of test action data elements indicating a sequence of test actions for testing software of the SUT, a plurality of path data elements indicating directories for storing test files, and a plurality of test input data elements indicating valid and invalid input for testing;

generating the test files based on the configuration file and at least one test file template, wherein generating the test files includes parsing the configuration file, identifying the data elements in the configuration file, and using the identified data elements and the at least one test file template to generate the test files, wherein a first test file generated contains the sequence of test actions for testing a feature or a bug in the SUT associated with the feature identifier or the bug identifier in the configuration file, wherein a second test file generated contains valid input for testing the SUT, and wherein a third test file generated contains invalid input for testing the SUT;

generating the directories in a file system based on the configuration file, wherein generating the directories includes generating, based on a first path data element of the plurality of path data elements, a first directory for storing the first test file and generating, based on a second path data element of the plurality of path data elements, a subdirectory of the first directory for storing the second test file and the third test file, wherein the generated directories are in a hierarchical directory structure associated with the feature identifier or the bug identifier in the configuration file, wherein each of the generated directories are named using a format that indicates the feature or the bug to be tested;

storing the test files in the directories, wherein storing the files in the directories includes storing the first test file in the first directory and storing, in the subdirectory of the first directory, the second test file and the third test file, wherein the first test file is named using a format that indicates the feature or the bug to be tested associated with the feature identifier or the bug identifier in the configuration file, wherein the second test file is named using a format that indicates that the second test file includes valid input, and wherein the third test file is named using a format that indicates that the third test file includes invalid input; and testing the feature or bug in the SUT using the test files, wherein testing the feature or bug in the SUT includes executing, by at least one computer, the sequence of test actions from the first test file using the valid input from the second test file and the invalid input from the third test file.

2. The method of claim 1 wherein the configuration file uses an initialization (INI) file format.

3. The method of claim 1 wherein the configuration file includes metadata for describing a test process, test requirements, bug information, or feature information.

4. The method of claim 1 wherein the SUT includes a network node, a network device, a Diameter signaling agent, a platform distribution system, a virtual operating environment, a platform management and configuration system, or an operating system.

5. The method of claim 1 wherein at least one of the test files uses an extensible markup language (XML) based file format or a timed text markup language (TTML) file format.

6. The method of claim 1 wherein the test plan includes one or more test cases.

7. The method of claim 1 wherein the test files and the directories are named using information stored in the configuration file.

8. A system for automated generation of test files and for related testing, the system comprising:

at least one processor;

a test file generator, wherein the test file generator is implemented using the at least one processor, wherein the test file generator is configured for automating the generation of directories for storing test files based on a configuration file, wherein the test file generator is configured to receive the configuration file, where the configuration file indicates a test case or a test plan to be generated, wherein the configuration file includes a feature identifier or a bug identifier and information about a system under test (SUT), wherein the configuration file includes a plurality of test action data elements indicating a sequence of test actions for testing software of the SUT, a plurality of path data elements indicating directories for storing test files, and a plurality of test input data elements indicating valid and invalid input for testing, to generate the test files based on the configuration file and at least one test file template, wherein generating the test files includes parsing the configuration file, identifying the data elements in the configuration file, and using the identified data elements and the at least one test file template to generate the test files, wherein a first test file generated contains the sequence of test actions for testing a feature or a bug in the SUT associated with the feature identifier or the bug identifier in the configuration file, wherein a second test file generated contains valid input for testing the SUT, and wherein a third test file generated contains invalid input for testing the SUT, to generate the directories in a file system based on the configuration file, wherein generating the directories includes generating, based on a first path data element of the plurality of path data elements, a first directory for storing the first test file and generating, based on a second path data element of the plurality of path data elements, a subdirectory of the first directory for storing the second test file and the third test file, wherein the generated directories are in a hierarchical directory structure associated with the feature identifier or the bug identifier in the configuration file, wherein each of the generated directories are named using a format that indicates the feature or the bug to be tested, and to store the test files in the directories, wherein storing the files in the directories includes storing the first test file in the first directory and storing, in the subdirectory of the first directory, the second test file and the third test file, wherein the first test file is named using a format that indicates the feature or the bug to be tested associated with the feature identifier or the bug identifier in the configuration file, wherein the second test file is named using a format that indicates that the second test file includes valid input, and wherein the third test file is named using a format that indicates that the third test file includes invalid input; and a test controller for testing the feature or bug in the SUT using the test files, wherein testing the feature or bug in the SUT includes executing, by at least one computer, the sequence of test actions from the first test file using the valid input from the second test file and the invalid input from the third test file.

9. The system of claim 8 wherein the configuration file uses an initialization (INI) file format.

10. The system of claim 8 wherein the configuration file includes metadata for describing a test process, test requirements, bug information, or feature information.

11. The system of claim 8 wherein the SUT includes a network node, a network device, a Diameter signaling agent, a platform distribution system, a virtual operating environment, a platform management and configuration system, or an operating system.

12. The system of claim 8 wherein at least one of the test files uses an extensible markup language (XML) based file format or a timed text markup language (TTML) file format.

13. The system of claim 8 wherein the test plan includes one or more test cases.

14. The system of claim 8 wherein the test file generator is configured to name the test files and the directories using information stored in the configuration file.

15. A non-transitory computer readable medium comprising computer executable instructions that when executed by at least one processor of a computer cause the computer to perform steps comprising:

at a test file generator, wherein the test file generator is implemented using the at least one processor, wherein the test file generator is configured for automating the generation of directories for storing test files based on a configuration file:

receiving the configuration file, where the configuration file indicates a test case or a test plan to be generated, wherein the configuration file includes a feature identifier or a bug identifier and information about a system under test (SUT), wherein the configuration file includes a plurality of test action data elements indicating a sequence of test actions for testing software of the SUT, a plurality of path data elements indicating directories for storing test files, and a plurality of test input data elements indicating valid and invalid input for testing;

generating the test files based on the configuration file and at least one test file template, wherein generating the test files includes parsing the configuration file, identifying the data elements in the configuration file, and using the identified data elements and the at least one test file template to generate the test files, wherein a first test file generated contains the sequence of test actions for testing a feature or a bug in the SUT associated with the feature identifier or the bug identifier in the configuration file, wherein a second test file generated contains valid input for testing the SUT, and wherein a third test file generated contains invalid input for testing the SUT;

generating the directories in a file system based on the configuration file, wherein generating the directories includes generating, based on a first path data element of the plurality of path data elements, a first directory for storing the first test file and generating, based on a second path data element of the plurality of path data elements, a subdirectory of the first directory for storing the second test file and the third test file, wherein the generated directories are in a hierarchical directory structure associated with the feature identifier or the bug identifier in the configuration file, wherein each of the generated directories are named using a format that indicates the feature or the bug to be tested;

storing the test files in the directories, wherein storing the files in the directories includes storing the first test file in the first directory and storing, in the subdirectory of the first directory, the second test file and the third test file, wherein the first test file is named using a format that indicates the feature or the bug to be tested associated with the feature identifier or the bug identifier in the configuration file, wherein the second test file is named using a format that indicates that the second test file includes valid input, and wherein the third test file is named using a format that indicates that the third test file includes invalid input; and testing the feature or bug in the SUT using the test files, wherein testing the feature or bug in the SUT includes executing, by at least one computer, the sequence of test actions from the first test file using the valid input from the second test file and the invalid input from the third test file.

16. The non-transitory computer readable medium of claim 15 wherein the configuration file uses an initialization (INI) file format.

* * * * *

UNITED STATES PATENT AND TRADEMARK OFFICE
CERTIFICATE OF CORRECTION

PATENT NO. : 10,268,570 B2
APPLICATION NO. : 15/147887
DATED : April 23, 2019
INVENTOR(S) : Morris Page 1 of 1

It is certified that error appears in the above-identified patent and that said Letters Patent is hereby corrected as shown below:

In the Specification

In Column 10, Lines 48-60, delete "In some embodiments, e.g., depicted in FIGS. 6A-6B, a metadata description portion of a test file may be HTML formatted and may include a 'PROBLEM DESCRIPTION' section for indicating a problem (e.g., bug) to be tested, a 'PROCESS' section for indicating actions to be performed during testing, a 'RESOURCES' section for indicating one or more URLs for obtaining additional information about the bug and/or SUT to be tested, a 'NOTES' section for indicating test observations or other information about testing the bug and/or SUT, and/or a 'TAGS' section for indicating one or more terms that may be indexable or searchable for various purposes, e.g., testing analytics and/or reporting." and insert the same on Column 10, Line 49, as a new paragraph.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*